United States Patent [19]
Martinez

[11] Patent Number: 6,023,154
[45] Date of Patent: Feb. 8, 2000

[54] PARALLEL AND INTERWOVEN BUCK CONVERTER FOR HIGH EFFICIENCY, LOW VOLTAGE POWER SUPPLY

[75] Inventor: Roberto Martinez, Plano, Tex.

[73] Assignee: International Rectifier Corporation, El Segundo, Calif.

[21] Appl. No.: 09/179,728

[22] Filed: Oct. 27, 1998

Related U.S. Application Data

[60] Provisional application No. 60/063,415, Oct. 28, 1997.

[51] Int. Cl.[7] .................................................. G05F 1/59
[52] U.S. Cl. ........................................ 323/272; 323/282
[58] Field of Search .................................. 323/271, 272, 323/282

[56] References Cited

U.S. PATENT DOCUMENTS

| | | | |
|---|---|---|---|
| 5,066,900 | 11/1991 | Bassett | 323/282 |
| 5,097,196 | 3/1992 | Schoneman | 323/271 |
| 5,479,089 | 12/1995 | Lee | 323/282 |
| 5,532,577 | 7/1996 | Doluca | 323/282 |
| 5,552,695 | 9/1996 | Schwartz | 323/272 |
| 5,565,761 | 10/1996 | Hwang | 323/282 |
| 5,568,044 | 10/1996 | Bittner | 323/272 |
| 5,592,071 | 1/1997 | Brown | 323/282 |
| 5,705,919 | 1/1998 | Wilcox | 323/282 |
| 5,757,173 | 5/1998 | Agiman | 323/282 |
| 5,886,508 | 3/1999 | Jutras | 323/282 |

*Primary Examiner*—Jeffrey Sterrett
*Attorney, Agent, or Firm*—Ostrolenk, Faber, Gerb & Soffen, LLP

[57] ABSTRACT

A power converter includes a plurality of switching stages, each switching stage including a series coupled pair of MOS-gated switching elements coupled together at a common node, each switching stage being connectable from a voltage source to a ground potential; a plurality of inductors coupled, at respective first ends, to the respective common nodes of the switching stages; and a shunt capacitor coupled from second ends of the plurality of inductors to the ground potential.

12 Claims, 5 Drawing Sheets

PARALLEL AND INTERWOVEN BUCK CONVERTER FOR HIGH EFFICIENCY, LOW VOLTAGE POWER SUPPLY

CROSS REFERENCE TO RELATED APPLICATION

This application is based on and claims priority to U.S. Provisional Patent Application Ser. No. 60/063,415, filed Oct. 28, 1997, entitled PARALLEL AND INTERWOVEN BUCK CONVERTER FOR HIGH EFFICIENCY, LOW VOLTAGE POWER SUPPLY.

BACKGROUND OF THE INVENTION

1. Field of Invention

The present invention relates to pulse width modulated power supplies and, more particularly, to paralleled buck converters employing an interwoven inductor scheme to improve power conversion efficiency.

2. Related Art

With reference to FIG. 1, prior art buck converters employing synchronous rectification include a series pass element, for example, a MOSFET QA and a shunt element, for example, a MOSFET QB operating in synchronism to produce a pulse width modulated signal for input to an inductor L coupled in series with a capacitor C. As is known in the art, a control circuit 10 produces gate drive signals for input to the MOSFETs QA, QB, such that the MOSFETs are alternately biased on and off to couple either Vin or ground to the inductor L, thereby producing the pulse width modulated signal.

The control 10 receives a feedback signal VFB from a resistor divider network comprising R1 and R2, such that a sample of the output voltage VO is fed back to the control 10 so that the control 10 may make appropriate modifications to the timing of the gate drive signals to the MOSFETs QA, QB.

The inductor L and capacitor C produce a second order output filter which filters the high frequency components from the pulse width modulated signal input to the inductor L such that a relatively smooth DC voltage is produced at VO. Further, since the resistor divider R1, R2 and control 10 provide a feedback voltage control, the DC voltage at VO is also regulated. As is known in the art, Vo=D×Vin, where D is the duty cycle of the pulse width modulated signal. Thus, Vout is less than or equal to Vin.

It is known that the current flowing through inductor L is substantially triangular with inflection points being substantially coincident with the switching times of the MOSFETs QA, QB. In order to meet ripple voltage requirements of the converter, a substantially large capacitor C must be selected to filter out voltage ripple which would result from the current ripple through the inductor L.

Unfortunately, in order to substantially reduce the voltage ripple at VO, excessively large capacitors C and/or inductors L must be employed which result in excessive cost and low power density of the convertor. Although the voltage ripple VO may be reduced by increasing the switching frequency of the MOSFETs QA, QB, such increases in switching frequency also result in increases in switching losses which also reduces the efficiency of the converter. The circuit shown in FIG. 1 typically has a n efficiency of about 85%.

Accordingly, there is a need in the art for a buck power converter which substantially reduces the ripple voltage at the output, VO, while also improving efficiency of the converter.

SUMMARY OF THE INVENTION

In order to overcome the disadvantages of the prior art, the circuit of the present invention includes a plurality of switching stages, each switching stage including a series coupled pair of MOS-gated switching elements coupled together at a common node, each switching stage being connectable from a voltage source to a ground potential; a plurality of inductors coupled, at respective first ends, to the respective common nodes of the switching stages; and a shunt capacitor coupled from second ends of the plurality of inductors to the ground potential.

BRIEF DESCRIPTION OF THE DRAWINGS

For the purpose of illustrating the invention, there is shown in the drawing a form which is presently preferred, it being understood, however, that the invention is not limited to the precise arrangement and instrumentality shown.

DETAILED DESCRIPTION OF THE PREFERRED EMBODIMENT

Figure 1:
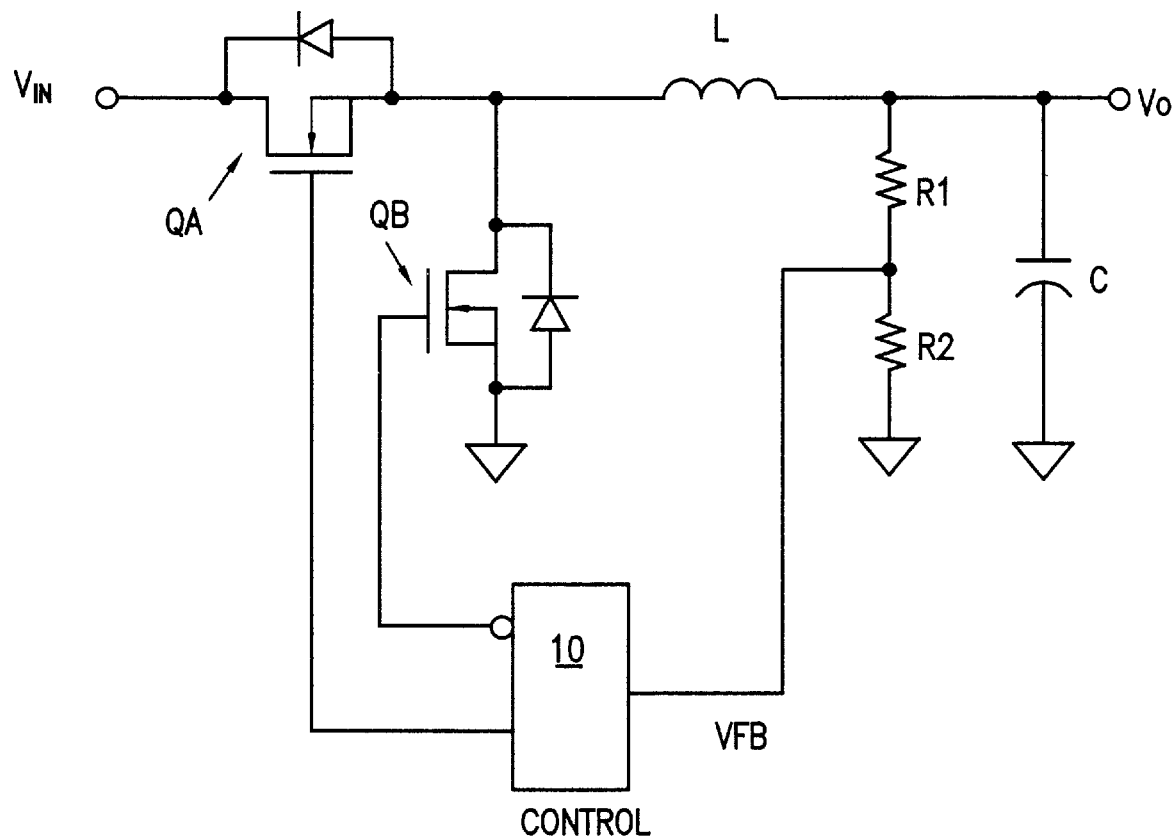
FIG. 1 shows a schematic circuit diagram of a prior art buck converter employing synchronous rectification.
Figure 2A:
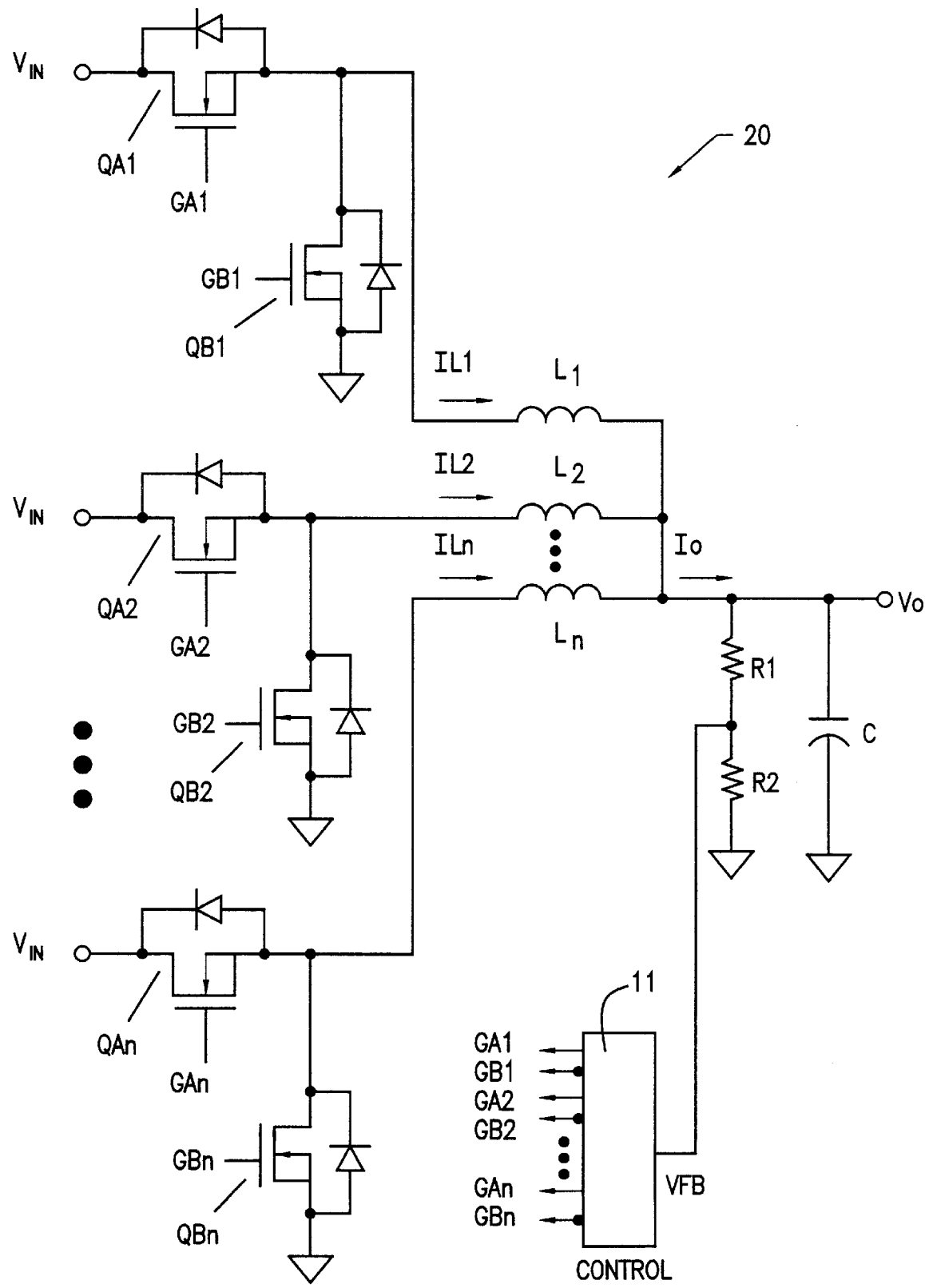
FIGS. 2a and 2b are schematic circuit diagrams showing a buck converter in accordance with the present invention.
Figure 2B:
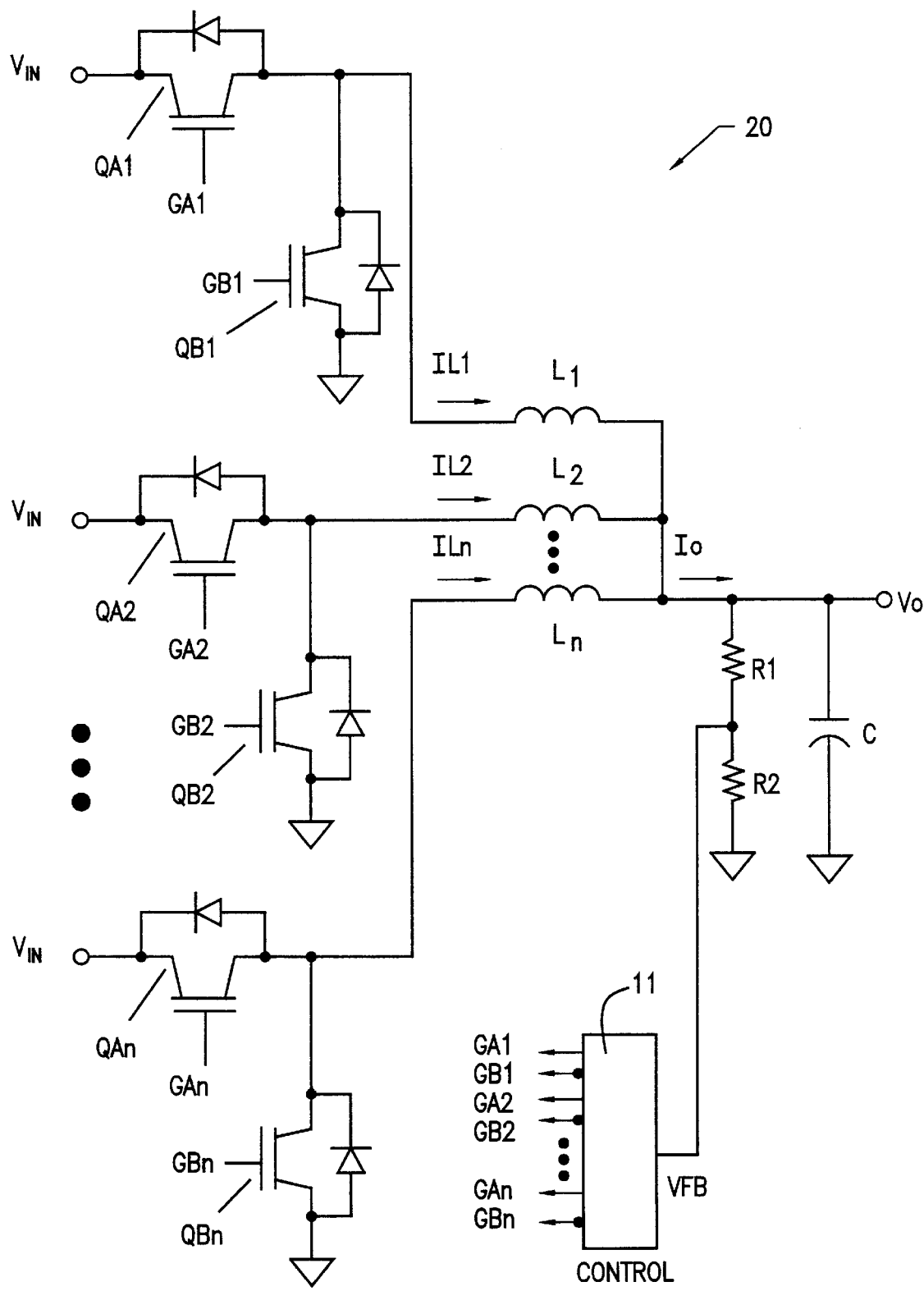

Referring now to the drawings, wherein like numerals indicate like elements, there is shown in FIG. 2 an interleaved quasi-square wave buck converter in accordance with the present invention. The converter 20 includes n stages for producing n pulse width modulated signals for input to an output filter. Each of the n stages is operatively coupled to an input bus, Vin, which is preferably a DC voltage of, for example, about 22 volts. Each of the n stages includes a series pass element QA and a shunt element QB. Preferably, the series element and shunt element are MOS-gated devices, for example, MOSFET's (as shown in FIG. 2a) or IGBJT's (as shown in figure 2b). As is known in the art, MOSFETs include an anti-parallel diode thereacross, which is shown in FIG. 2.

Each of the series and shunt elements receives a gate drive signal from a control 11, such that the series and shunt elements are alternately biased on and off to produce the pulse width modulated signals. Preferably, the gate drive signals from the control 11 are phase shifted from one another such that the series elements from each of the stages are not biased on and off at the same instant. Similarly, it is preferred that the shunt elements of the stages are not biased on and off at the same instant.

Figure 3:
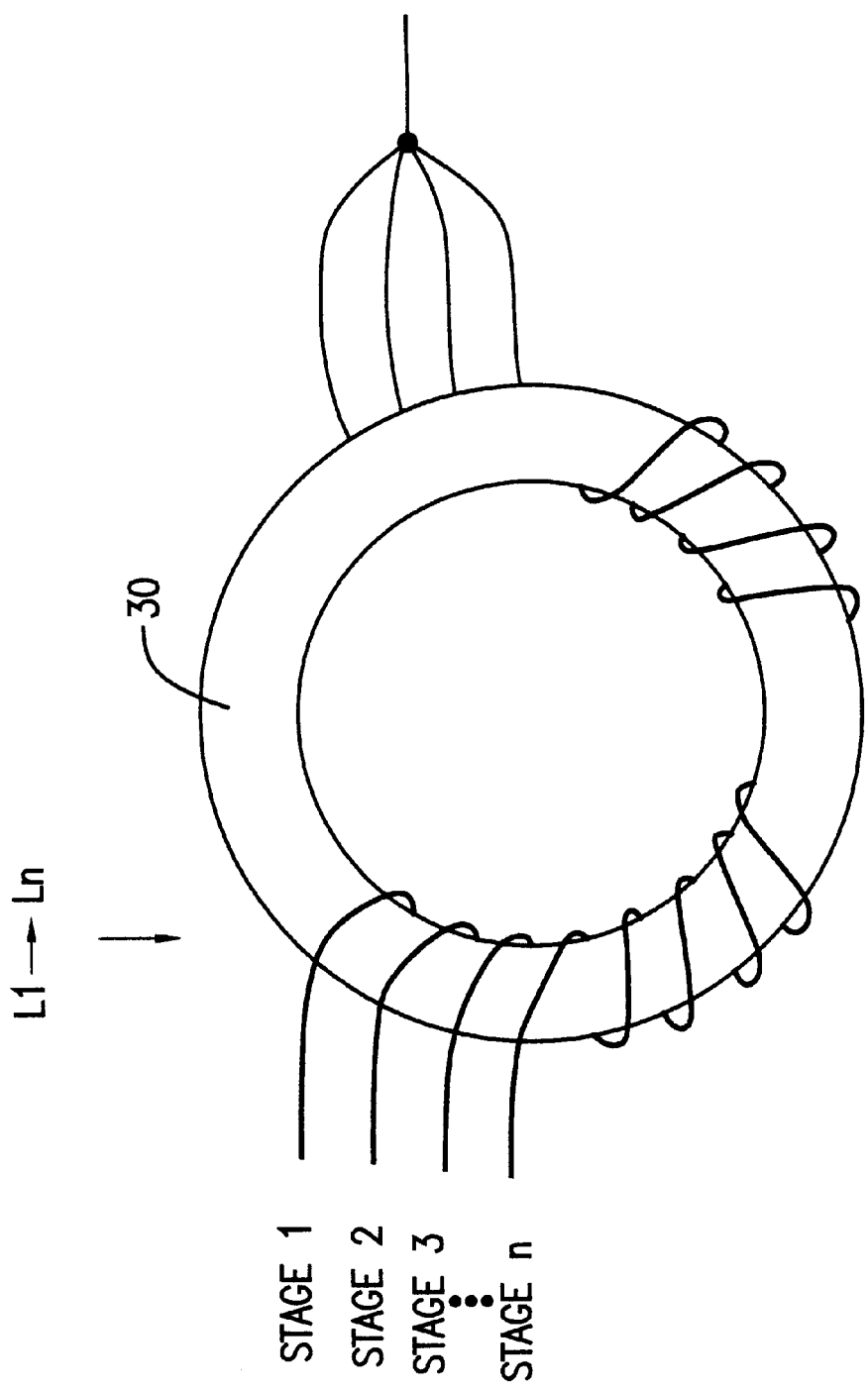
FIG. 3 is a diagram showing an interleaved inductor in accordance with the invention.

The pulse width modulated signals from each of the stages are input to inductors L1 through Ln, respectively. Inductors L1 through Ln may be separate inductors; however, it is preferred that inductors L1 through Ln are wound on a common core in an interleaved fashion. FIG. 3 shows a toroidal inductor which includes windings from stages 1 through n wound on a common core 30. As shown, the inductor is a toroidal inductor and the core 30 may be, for example, an MPP core.

Inductors L1 through Ln are each connected, at one end, to stages 1 through n. Opposite ends of inductors L1 through Ln are coupled together and a capacitor C is connected in a shunt relationship from that common connection to ground.

Thus, interleaved inductors L1 through Ln and capacitor C form a low pass filter for filtering the pulse width modulated signals from stages 1 through n to produce a substantially smooth DC voltage at VO.

Resistors R1 and R2 are coupled in a resistor divider network to sample the DC output voltage, VO, and produce a feedback voltage VFB for input to the control 11.

It has been found that paralleling stages 1 through n and interleaving the inductors L1 through Ln substantially improves the efficiency of the converter 20. Indeed, it has been found that the efficiency of a converter employing the techniques shown in FIG. 2 achieves an efficiency of about 90%, and may exceed 90%. This is so at least in part because the switching losses of the transistors QA and QB of the respective stages experience lower switching losses due, for example, to the lower currents carried thereby and to the potentially lower switching frequencies which may be employed.

Figure 4:
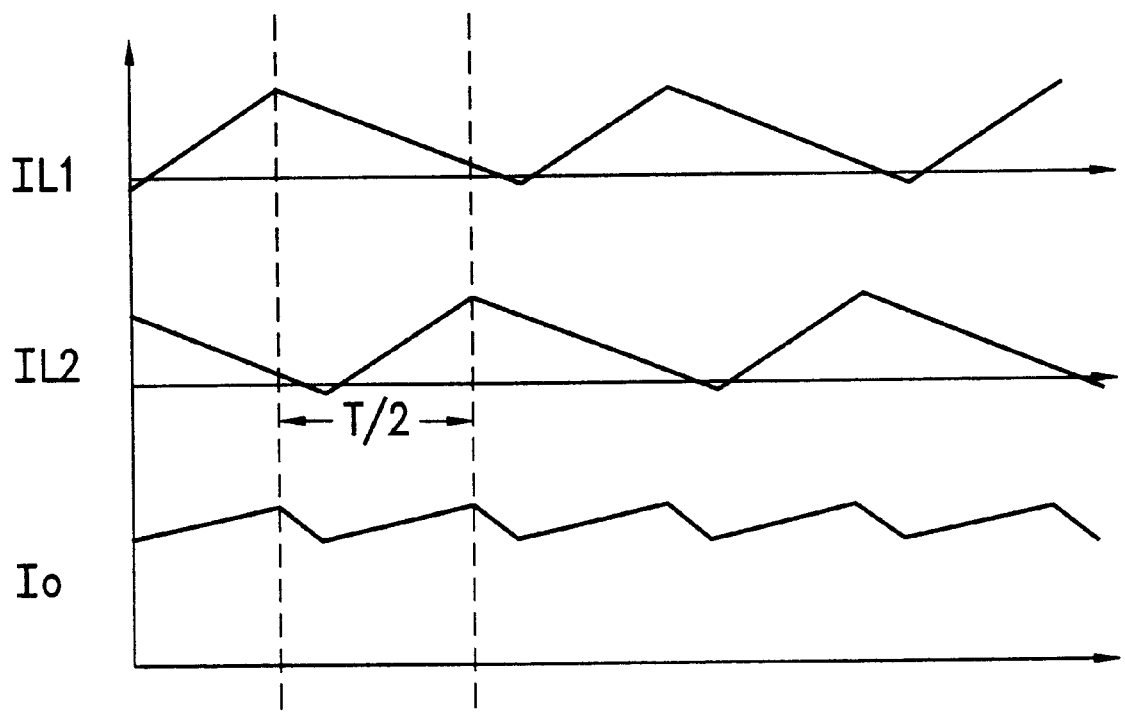
FIG. 4 is a chart showing inductor current in accordance with the invention.

Referring to FIG. 4, it can be seen that employing interleaved inductors L1 through Ln in the output filter results in a lower ripple current in the total inductor current IO. More particularly, a component of the total output current IO produced by stage 1 (labelled IL1) combines with a component of the total output current IO from stage 2 (labelled IL2) to produce a total output current IO having a lower ripple current than either of the component currents IL1, IL2 taken alone.

Further, the frequency of the total output current ripple is higher than either of the ripple currents of the current components IL1 or IL2. Consequently, the output voltage ripple resulting from the current ripple on IO is substantially reduced using the interleaved inductors L1 through Ln.

Still further, the output voltage ripple requirements for the convertor 20 may be more easily met using the paralleled stages and interleaved inductors because the output bulk capacitor C may be reduced, thereby reducing cost and increasing power density. It has been found that employing the circuit of FIG. 2 may result in about a 50% reduction in the value of the capacitance C.

Transient response may be improved by saturating the control 11 when required. Thus, the inductor currents IL1 through ILn may rise concurrently, thereby resulting in improved transient response. This may also result in reducing the amount of filter capacitance required.

It is noted that the system of FIG. 2 permits the use of larger inductances for each of the inductors L1 through Ln (without adversely impacting the ripple current) which has the additional benefit of substantially reducing any negatively flowing inductor current.

The foregoing description of the preferred embodiment of the present invention has been provided for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A switchmode power converter, comprising:
   a plurality of switching stages, each switching stage including a series coupled pair of MOS-gated switching elements coupled together at a common node, each switching stage being connectable from a voltage source to a ground potential;
   a plurality of inductors coupled, at respective first ends, to the respective common nodes of the switching stages; and
   a shunt capacitor coupled from second ends of the plurality of inductors to the ground potential.

2. The switchmode power converter of claim 1, wherein the plurality of inductors are wound on a common core in an interleaved manner.

3. The switchmode power converter of claim 2, wherein the common core is formed of molypermalloy powder and has a substantially toroidal shape.

4. The switchmode power converter of claim 1, further comprising a control circuit coupled to each MOS-gated switching element, the control circuit operable to provide respective gate signals to the MOS-gated switching elements which bias them on and off.

5. The switchmode power converter of claim 4, wherein each series coupled pair of MOS-gated switching elements includes:
   at least one series MOS-gated switching element coupled in series with the respective inductor; and
   at least one MOS-gated switching element coupling the respective inductor to the ground potential.

6. The switchmode power converter of claim 5, wherein the control circuit provides the gate signals to the MOS-gated switching elements such that the at least one series MOS-gated switching element of each switching stage turns on and off at substantially different instants from one another.

7. The switchmode power converter of claim 5, wherein the control circuit provides the gate signals to the MOS-gated switching elements such that the at least one shunt MOS-gated switching element of each switching stage turns on and off at substantially different instants from one another.

8. The switchmode power converter of claim 5, wherein the control circuit provides the gate signals to the MOS-gated switching elements such that the at least one series MOS-gated switching element of each switching stage turns on and off at substantially the same instant.

9. The switchmode power converter of claim 1, wherein the MOS-gated switching elements are MOSFETs.

10. The switchmode power converter of claim 1, wherein the MOS-gated switching elements are insulated gate bipolar transistors.

11. The switchmode power converter of claim 1, wherein the voltage source is a DC voltage source.

12. The switchmode power converter of claim 1, rein the DC voltage source is at a potential of about 22 volts.

* * * * *

(12) EX PARTE REEXAMINATION CERTIFICATE (5742nd)
United States Patent
Martinez

(10) Number: US 6,023,154 C1
(45) Certificate Issued: Apr. 17, 2007

(54) PARALLEL AND INTERWOVEN BUCK CONVERTER FOR HIGH EFFICIENCY, LOW VOLTAGE POWER SUPPLY

(75) Inventor: Roberto Martinez, Plano, TX (US)

(73) Assignee: Banque Nationale de Paris, Los Angeles, CA (US)

Reexamination Request:
No. 90/006,813, Oct. 20, 2003

Reexamination Certificate for:
Patent No.: 6,023,154
Issued: Feb. 8, 2000
Appl. No.: 09/179,728
Filed: Oct. 27, 1998

Related U.S. Application Data

(60) Provisional application No. 60/063,415, filed on Oct. 28, 1997.

(51) Int. Cl.
*G05F 1/59* (2006.01)

(52) U.S. Cl. .................................. 323/272; 323/282
(58) Field of Classification Search ............ 323/271, 323/272, 282
See application file for complete search history.

(56) References Cited

U.S. PATENT DOCUMENTS

| 5,477,132 A | | 12/1995 | Canter et al. ............... 323/282 |
| 5,592,071 A | * | 1/1997 | Brown ....................... 323/282 |
| 5,602,464 A | * | 2/1997 | Linkowsky et al. ......... 323/272 |

OTHER PUBLICATIONS

Optimization of Spacecraft Battery Charger/Discharger Systems—Dissertation—Daniel M. Sable—Dec. 17, 1991—Virginia Polytechnic Institute and State University.

* cited by examiner

*Primary Examiner*—Adolf Berhane

(57) ABSTRACT

A power converter includes a plurality of switching stages, each switching stage including a series coupled pair of MOS-gated switching elements coupled together at a common node, each switching stage being connectable from a voltage source to a ground potential; a plurality of inductors coupled, at respective first ends, to the respective common nodes of the switching stages; and a shunt capacitor coupled from second ends of the plurality of inductors to the ground potential.

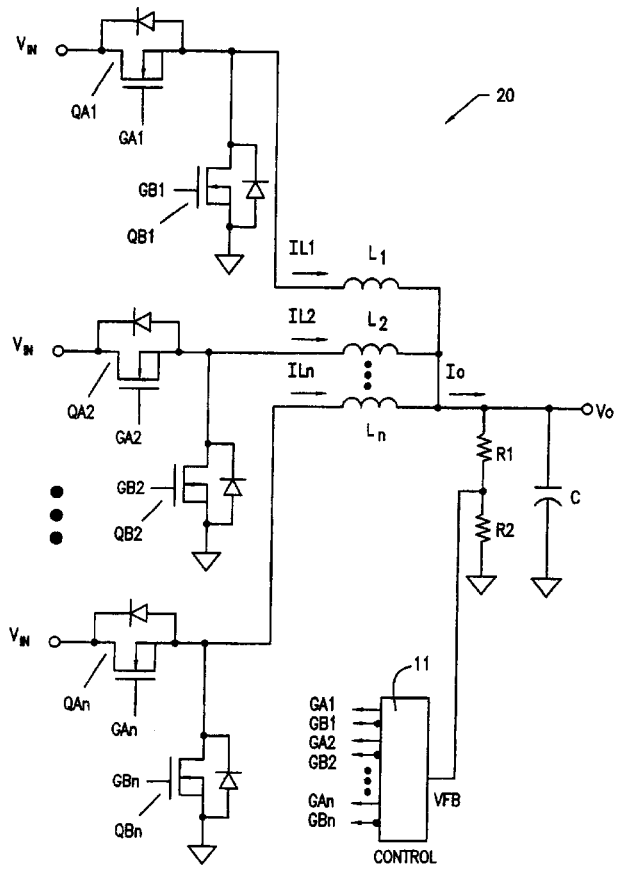

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–11 is confirmed.

Claim 12 is determined to be patentable as amended.

New claims 13–24 are added and determined to be patentable.

12. The switchmode power converter of claim [1] *11*, wherein the DC voltage source is at a potential of about 22 volts.

*13. A single directional switchmode power converter for converting a voltage source input to a DC output, comprising:*

*a plurality of switching stages, each switching stage including a series coupled pair of MOS-gated switching elements coupled together at a common node, each switching stage being connectable to the voltage source input to a ground potential;*

*a plurality of inductors coupled, at respective first ends, to the respective common nodes of the switching stages; and*

*a shunt capacitor coupled from second ends of the plurality of inductors to the ground potential.*

*14. The switchmode power converter of claim 13, wherein the plurality of inductors are wound on a common core in an interleaved manner.*

*15. The switchmode power converter of claim 14, wherein the common core is formed of molypermalloy powder and has a substantially toroidal shape.*

*16. The switchmode power converter of claim 13, further comprising a control circuit coupled to each MOS-gated switching element, the control circuit operable to provide respective gate signals to the MOS-gated switching elements which bias them on and off.*

*17. The switchmode power converter of claim 16, wherein each series coupled pair of MOS-gated switching elements includes:*

*at least one series MOS-gated switching element coupled in series with the respective inductor; and*

*at least one MOS-gated switching element coupling the respective inductor to the ground potential.*

*18. The switchmode power converter of claim 17, wherein the control circuit provides the gate signals to the MOS-gated switching elements such that the at least one series MOS-gated switching elements of each switching stage turns on and off at substantially different instants from one another.*

*19. The switchmode power converter of claim 17, wherein the control circuit provides the gate signals to the MOS-gated switching elements such that the at least one shunt MOS-gated switching element of each switching stage turns on and off at substantially different instants from one another.*

*20. The switchmode power converter of claim 17, wherein the control circuit provides the gate signals to the MOS-gated switching elements such that the at least one series MOS-gated switching element of each switching stage turns on and off at substantially the same instant.*

*21. The switchmode power converter of claim 13, wherein the MOS-gated switching elements are MOSFETs.*

*22. The switchmode power converter of claim 13, wherein the MOS-gated switching elements are insulated gate bipolar transistors.*

*23. The switchmode power converter of claim 13, wherein the voltage source is a DC voltage source.*

*24. The switchmode power converter of claim 23, wherein the DC voltage source is at a potential of about 22 volts.*

\* \* \* \* \*